US008631392B1

(12) United States Patent
Owen et al.

(10) Patent No.: US 8,631,392 B1
(45) Date of Patent: Jan. 14, 2014

(54) ANALYSIS OF A SEQUENCE OF DATA IN OBJECT-ORIENTED ENVIRONMENTS (75) Inventors: James G. Owen, Bolton, MA (US); Rajiv Singh, Worcester, MA (US); Rong Chen, Vernon, CT (US); Pascal Gahinet, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 27 days.

(21) Appl. No.: 13/243,336

(22) Filed: Sep. 23, 2011

Related U.S. Application Data

(63) Continuation of application No. 11/475,320, filed on Jun. 27, 2006, now Pat. No. 8,046,749.

(51) Int. Cl.
G06F 9/45 (2006.01)

(52) U.S. Cl.
USPC ............ 717/141; 717/102; 717/108; 717/116

(58) Field of Classification Search
None
See application file for complete search history.

(56) References Cited

U.S. PATENT DOCUMENTS

| 5,632,034 | A | * | 5/1997 | O'Farrell ...................... 717/140 |
| 5,730,144 | A | * | 3/1998 | Katz et al. ...................... 600/526 |
| 5,768,590 | A | | 6/1998 | Kimura et al. |
| 5,782,240 | A | * | 7/1998 | Raviv et al. ................... 600/484 |
| 5,926,822 | A | | 7/1999 | Garman |
| 6,360,188 | B1 | | 3/2002 | Freidman et al. |
| 6,400,996 | B1 | | 6/2002 | Hoffberg et al. |
| 6,424,989 | B1 | | 7/2002 | Shaw et al. |
| 6,473,794 | B1 | | 10/2002 | Guheen et al. |
| 6,490,719 | B1 | | 12/2002 | Thomas |
| 6,961,925 | B2 | * | 11/2005 | Callahan et al. .............. 717/128 |
| 7,020,697 | B1 | | 3/2006 | Goodman et al. |
| 7,139,999 | B2 | | 11/2006 | Bowman-Amuah |
| 7,181,694 | B2 | | 2/2007 | Reiss et al. |
| 7,213,227 | B2 | | 5/2007 | Kompalli et al. |
| 7,266,773 | B2 | | 9/2007 | Dorwart |
| 7,315,826 | B1 | | 1/2008 | Guheen et al. |
| 7,324,924 | B2 | | 1/2008 | Barajas et al. |
| 7,333,907 | B2 | | 2/2008 | Delenstarr et al. |
| 7,577,935 | B2 | | 8/2009 | Reynolds |
| 7,603,649 | B2 | * | 10/2009 | Poindexter et al. ........... 717/102 |
| 7,660,815 | B1 | | 2/2010 | Scofield et al. |
| 7,805,466 | B2 | * | 9/2010 | Aspinall ....................... 707/812 |

(Continued)

OTHER PUBLICATIONS

Title: An object-oriented data model for a time series management system, author: Dreyer, W et al, source: IEEE, dated: 1994.*

(Continued)

Primary Examiner — Chameli Das
(74) Attorney, Agent, or Firm — Nelson Mullins Riley & Scarborough LLP (57) ABSTRACT

A tool for analyzing a sequence of data in an object-oriented environment is disclosed. In an embodiment, the sequence of data may include time-indexed sequence of data ("time series data"). The tool may enable a user to generate a time series object for encapsulating the time series data in the object-oriented environment. The user may construct the time series object from data or mathematical expressions using a command line interface. The time series object may include a sequence of objects implementing APIs that supply an interface for analyzing the times series data in the time series object. The user may analyze the time series data encapsulated in the time series object using the APIs of the time series object.

34 Claims, 4 Drawing Sheets

(56) References Cited

U.S. PATENT DOCUMENTS

| | | | |
|---|---|---|---|
| 8,151,242 B1* | 4/2012 | Takayanagi et al. | 717/104 |
| 2001/0052108 A1 | 12/2001 | Bowman-Amuah | |
| 2002/0066076 A1* | 5/2002 | Nagashima et al. | 717/108 |
| 2002/0087416 A1 | 7/2002 | Knutson | |
| 2002/0169735 A1 | 11/2002 | Kil et al. | |
| 2002/0184401 A1* | 12/2002 | Kadel et al. | 709/315 |
| 2003/0023951 A1 | 1/2003 | Rosenberg | |
| 2003/0056147 A1 | 3/2003 | Yutkowitz | |
| 2003/0058277 A1* | 3/2003 | Bowman-Amuah | 345/765 |
| 2003/0066057 A1* | 4/2003 | RuDusky | 717/140 |
| 2003/0140023 A1 | 7/2003 | Ferguson et al. | |
| 2003/0177187 A1 | 9/2003 | Levine et al. | |
| 2004/0015579 A1* | 1/2004 | Cooper et al. | 709/223 |
| 2004/0015906 A1* | 1/2004 | Goraya | 717/141 |
| 2004/0070594 A1* | 4/2004 | Burke | 345/716 |
| 2004/0107125 A1 | 6/2004 | Guheen et al. | |
| 2004/0225636 A1* | 11/2004 | Heinzel et al. | 707/1 |
| 2004/0230445 A1* | 11/2004 | Heinzel et al. | 705/1 |
| 2005/0047646 A1 | 3/2005 | Jojic et al. | |
| 2005/0183073 A1* | 8/2005 | Reynolds | 717/141 |
| 2005/0246161 A1 | 11/2005 | Sakurai | |
| 2005/0283751 A1 | 12/2005 | Bassin et al. | |
| 2005/0288863 A1 | 12/2005 | Workman | |
| 2006/0026560 A1* | 2/2006 | Kornerup et al. | 717/113 |
| 2006/0095833 A1 | 5/2006 | Orchard et al. | |
| 2006/0161071 A1* | 7/2006 | Lynn et al. | 600/538 |
| 2006/0200259 A1 | 9/2006 | Hoffberg et al. | |
| 2006/0259949 A1* | 11/2006 | Schaefer et al. | 726/1 |
| 2007/0112714 A1* | 5/2007 | Fairweather | 706/46 |
| 2008/0297513 A1 | 12/2008 | Greenhill et al. | |
| 2009/0089657 A1* | 4/2009 | Davis | 715/234 |
| 2009/0228253 A1 | 9/2009 | Tolone et al. | |
| 2009/0240586 A1 | 9/2009 | Ramer et al. | |
| 2009/0319672 A1 | 12/2009 | Reisman | |
| 2010/0094878 A1 | 4/2010 | Soroca et al. | |

OTHER PUBLICATIONS

Li, Quanzhong et al., "Skyline Index for Time Series Data," IEEE Transactions on Knowledge and Data Engineering, vol. 16(6):669-684 (2004).

Matus-Castillejos, Abel et al., "A Time Series Data Management Framework," Proceedings of the International Conference on Information Technology: Coding and Computing, vol. 1:220-225 (2005).

Northrop, Linda M., "Object-Oriented Development," retrieved online at: http://onlinelibrary.wiley.com/doi/10.1002/0471028959.sof222ful, 17 pages (2002).

Time-Series Objects, retrieved online at: http://web.archive.org/web/20050416064940/stat.ethz.ch/R-manual/R-patched/library/stats/html/ts.html, 3 pages (2005).

XML DOM—The Document Object, retrieved online at: http://www.w3schools.com/DOM/dom_document.asp 2 pages (1999-2003).

* cited by examiner

ANALYSIS OF A SEQUENCE OF DATA IN OBJECT-ORIENTED ENVIRONMENTS

This Application is continuation of U.S. patent application Ser. No. 11/475,320, which was filed on Jun. 27, 2006. The above-identified application is hereby incorporated by reference in its entirety as though fully set forth herein.

FIELD OF THE INVENTION

The present invention relates generally to a data analysis tool, and more particularly to a method, system and medium for analyzing a sequence of data in object oriented environments.

BACKGROUND OF THE INVENTION

Data can be generated and analyzed in an indexed sequence of data. Time series data is a sequence of data measured at successive times spaced apart at time intervals. The time series data can be analyzed to make forecasts or predictions of future events based on known past events. In the financial industry, for example, time series data, such as equity price or interest fluctuations, can provide forecasts or predictions of a future price of a share of stock or interest rate based on the past data.

Non-uniformly sampled time series data may be difficult to analyze because most analytical methods or algorithms such as those used for forecasting, filtering or spectral analysis, assume that a uniform separation of data sample times. Similarly they can be difficult to combine and compare because comparable data will not necessarily occur at exactly the same times. Therefore it is desired to modify time series data through operations, such as re-sampling and interpolation, to overcome these problems. In particular, when data is generated from the multiple tests or simulations of a system, each test or simulation may produce data with it's own time index. Therefore, it is desired to provide a method for representing and analyzing time series data in an easy and efficient manner.

SUMMARY OF THE INVENTION

The present invention provides easy and efficient methods of linking time and data when processing and analyzing time series data. For example, operations, such as filtering, Fourier transforming or forecasting timed data, require knowledge of the time stamp of each data sample. Encapsulating the time, data and metadata within a single object simplifies the syntax of a programming language which performs these types of tasks on data by grouping all the required variables in a single entity. Furthermore, the probability of an error in analysis or programming is reduced by maintaining the time and data correctly synchronized at all times.

The present invention provides a data analysis tool for analyzing a sequence of data in an object-oriented environment. An object-oriented environment is a computing environment organized around "objects" rather than procedures. In the object-oriented environment, programmers define the data type of a data structure and the types of operations and functions that can be applied to the data structure. The data structure becomes an object that includes both data and functions. In addition, programmers can create relationships between one object and another. One of the advantages of the object-oriented environment is that it enables programmers to create modules that do not need to be changed when a new type of object is added.

In an embodiment, the sequence of data may include a time-indexed sequence of data ("time series data"). The tool may enable a user to generate a time series object for encapsulating the time series data in the object-oriented environment. The user may construct the time series object from data or mathematical expressions using a command line interface. The time series object may include a data array and a time array. The data and time arrays in the time series object may be a numeric array. Alternatively time and data may be represented by a sequence of objects implementing APIs that supply an interface for analyzing the time series data within the time series object. The user may analyze the time series data encapsulated in the time series object using the APIs of the time series object.

In another embodiment of the present invention, a user may create multiple time series objects for storing different sequences of time series data. The present invention may enable the user to create a time series collection object in which one or more time series objects can be grouped or wrapped. In this state the time series objects may store their time vectors in a common time array in the time series collection object. The methods of the time series collection object can be applied to the time series data of each time series object in the time series collection object simultaneously, and hence enable the user to analyze the ensemble of time series data within the time series collection with a single operation.

The data and time arrays of a time series object can be stored as references to external data using a data storage object to represent the connection to the external data source. The data storage object provides a wrapper with a consistent interface for data access APIs specific to each data source. When a user reads or writes data to the data or time arrays of the time series object, the data will be read from or written to the data storage object, which in turn reads or writes data to the data source via the data access API.

Abstraction of a data source can provide the option of storing the data of a time series object in an external data source, such as a database or file. The use of references to external data sources as an alternative to storing the data within the time series object can enable a user to manage memory more efficiently when working with large data sets or with large numbers of time series objects. Furthermore, managing the connection to external data within the time series eliminates the need for the user to manually read or write from an external data source. Abstracting data storage using data storage objects can also be used to optimize the method of storage within the time series object. For example, the storage object can store the data internally to the object-oriented environment in a compressed form using a lossless compression algorithm or mathematical expression to represent the data more succinctly.

In accordance with one aspect of the present invention, a system for analyzing a sequence of data in an object oriented environment. The system includes a constructor for constructing a series object encapsulating the sequence of data. The properties of the object include the sequence of data itself and the indices and metadata associated with the sequence of data. The system also includes an API for manipulating data in the series object to analyze the sequence of data.

In accordance with another aspect of the present invention, a system is provided for analyzing a plurality of sequences of data in an object oriented environment. The system includes a constructor for creating a collection object that includes a first object for encapsulating a first sequence of data and optionally additional objects for encapsulating additional sequences of data. The collection object has properties and methods, wherein the properties of the collection object includes an index vector that is shared by all included sequences of data. The system also includes an API for analyzing the included sequences of data.

In accordance with another aspect of the present invention, a computer-implemented method is provided for analyzing a sequence of data in an object oriented environment. The method provides a series object for encapsulating the sequence of data, wherein the object has properties and methods. The properties of the object include the sequence of data, and the indices and metadata associated with the sequence of data. The sequence of data is analyzed by using the methods of the object.

In accordance with another aspect of the present invention, a computer-implemented method is provided for analyzing a plurality of sequences of data in an object oriented environment. The method provides a collection object that includes a first object for encapsulating a first sequence of data and optionally additional objects for encapsulating additional sequences of data. The collection object has properties and methods, wherein the properties of the collection object includes an index vector that is shared by all included sequences of data. The included sequences of data are analyzed by using the methods of the collection object.

In accordance with another aspect of the present invention, a medium holding computer executable instructions is provided for analyzing a sequence of data in an object oriented environment. The instructions are executed to provide a series object for encapsulating the sequence of data. The object has properties and methods, wherein the properties of the object include the sequence of data, and the indices and metadata associated with the sequence of data. The sequence of data is analyzed by using the methods of the object.

In accordance with another aspect of the present invention, a medium holding computer executable instructions is provided for analyzing a plurality of sequences of data in an object oriented environment. The instructions are executed to provide a collection object that includes a first object for encapsulating a first sequence of data and optionally additional objects for encapsulating additional sequences of data. The collection object has properties and methods, wherein the properties of the collection object includes an index vector that is shared by the included sequences of data. The included sequences of data are analyzed by using the methods of the collection object.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a data analysis tool for analyzing time series data in an object oriented environment. Although the data is indexed with time in the illustrative embodiment, one of ordinary skill in the art will appreciate that the data can be indexed with different quantities, such as frequency and position, in other embodiments. The object-oriented environment may enable a user to create a time series object for encapsulating the time series data. The time series object may include a data array and a time array. The time array may contain the time index of each data in the data array. The time series object may implement APIs that provide an interface for analyzing the time series data in the time series object.

In illustrative embodiment of the present invention, the user may create multiple time series objects for storing different sequences of time series data. The object-oriented environment may enable the user to create a time series collection object in which one or more time series objects can be wrapped or contained. The time series objects may share a common time array in the time series collection. With the time series collection object, the user can analyze multiple sequences of time series data simultaneously.

Figure 1:
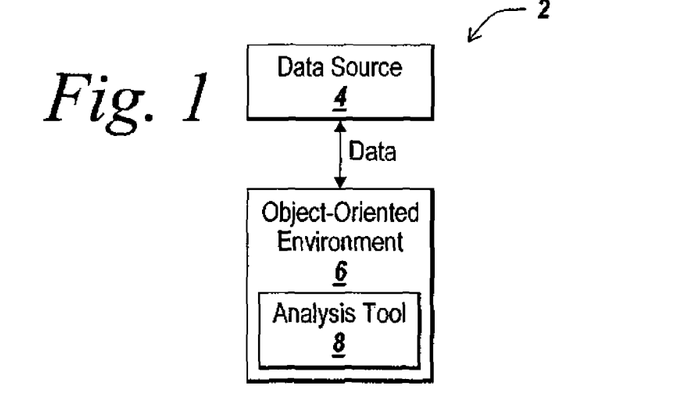
FIG. 1 depicts an exemplary system suitable for practicing the illustrative embodiment of the present invention.

FIG. 1 is an exemplary system 2 suitable for practicing the illustrative embodiment of the present invention. The system 2 includes a data source 4 and an object-oriented environment 6 coupled to the data source 4. Although the data source 4 is depicted externally to the object-oriented environment 6 in the illustrative embodiment, one of ordinary skill in the art will appreciate that the data source 4 can be provided internally to the object-oriented environment 6. The data source 4 can be a file, a database, a storage device or a data acquisition device where the communication is mediated through APIs wrapped in a data source object. One of ordinary skill in the art will also appreciate that these data sources are illustrative and the data source 4 can be provided in different form, for example as an algorithm which generates data from, or represents data as, a mathematical expression in other embodiments.

An exemplary object oriented environment 6 can be provided by MATLAB® from The MathWorks, Inc. of Natick, Mass. MATLAB® is an intuitive language and provides a technical computing environment. The MATLAB® environment integrates mathematical computing, visualization, and a powerful technical language. MATLAB® provides core mathematics and advanced graphical tools for data analysis, visualization, and algorithm and application development. MATLAB® provides a range of computing tasks in engineering and science, from data acquisition and analysis to application development. Built-in interfaces of MATLAB® enable users to access and import data from instruments, files, and external databases and programs. In addition, MATLAB® enables the users to integrate external routines written in the C, C++, Fortran, and JAVA programming languages with the MATLAB® applications.

MATLAB® supports dynamically typed programming. In a dynamically typed programming environment, types are assigned to each data value in memory at runtime, rather than assigning a type to a static, syntactic entity in the program source code. The dynamically typed programming environment catches errors related to the misuse of values at the time the erroneous statement or expression is executed. In contrast, types are assigned to sets of values based on the program's source code in a statically typed programming environment. Static type disciplines operate on program source code rather than on the program execution. Therefore, in the statically typed programming environment, certain kinds of errors are detected without executing the program.

The object-oriented environment 6 may provide a tool 8 for receiving time series data from the data source 4 and analyzing the time series data to provide a user with useful information on the time series data. The tool 8 may enable the user to create a time series object for encapsulating the time series data received from the data source 4. The tool 8 may also provide functions and methods to support the analysis of the time series data including plotting, descriptive statistics, correlation, interpolation, filtering, Fourier analysis, etc. The tool 8 is described below in more detail with reference to FIGS. 4-11.

One of ordinary skill in the art will also appreciate that the data source 4 and the analysis tool 8 may be provided on the same device, which will be described below in more detail with reference to FIG. 2, or alternatively, the data source 4 and the object-oriented environment 6 may be coupled to each other via a communication network, which will be described below in more detail with reference to FIG. 3.

Figure 2:
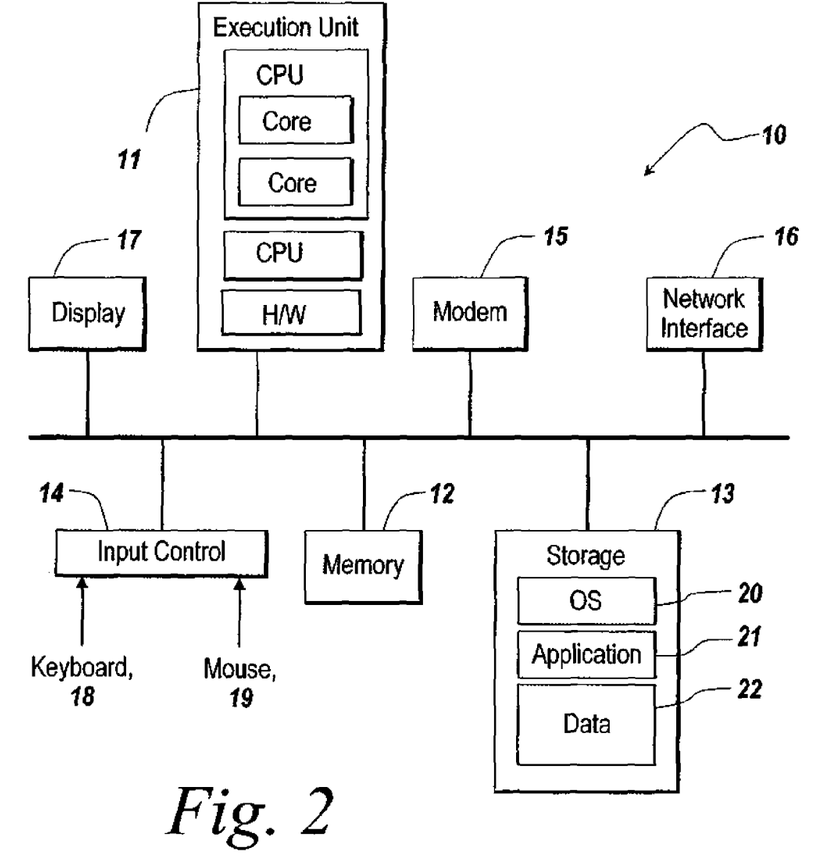
FIG. 2 is an exemplary computing device for implementing the illustrative embodiment of the present invention.

FIG. 2 is an exemplary computing device 10 suitable for practicing the illustrative embodiment of the present invention. One of ordinary skill in the art will appreciate that the computing device 10 is intended to be illustrative and not limiting of the present invention. The computing device 10 may take many forms, including but not limited to a workstation, server, network computer, quantum computer, optical computer, bio computer, Internet appliance, mobile device, a pager, a tablet computer, and the like.

The computing device 10 may be electronic and include an execution unit 11, memory 12, storage 13, an input control 14, a modem 15, a network interface 16, a display 17, etc. The execution unit 11 controls each component of the computing device 10 to provide the data source 4, the object-oriented environment 6 and the analysis tool 8. The memory 12 temporarily stores instructions and data and provides them to the execution unit 11 so that the execution unit 11 operates the computing device 10 and runs the analysis tool 8.

Optionally, the computing device 10 may include multiple Central Processing Units (CPUs) for executing software loaded in the memory 12, and other programs for controlling system hardware. Each of the CPUs can be a single or multiple core processor. The code loaded in the memory 12 may run in a virtualized environment, such as in a Virtual Machine (VM). Multiple VM's may be resident on a single processor. Also, part of the application could be run in hardware, for example, by configuring a field programmable gate array (FPGA) or creating an application specific integrated circuit (ASIC).

The storage 13 usually contains software tools for applications. The storage 13 includes, in particular, code 20 for the operating system (OS) of the device 10, code 21 for applications running on the operation system including the object-oriented environment 6 and the analysis tool 8, and data 22 of the data source 4. Those of ordinary skill in the art will appreciate that the application can be stored in the memory 12 as well, much like the data, and even the OS, or they can be stored on the network described below with reference to FIG. 3.

The input control 14 may interface with a keyboard 18, a mouse 19, and other input devices. The computing device 10 may receive through the input control 14 input data, such as the input data for selecting analysis methods, which will be described below with reference to FIGS. 6-9. The computing device 10 may display on the display 17 user interfaces 9 for generating the time series object and manipulating the time series data in the time series object.

Figure 3:
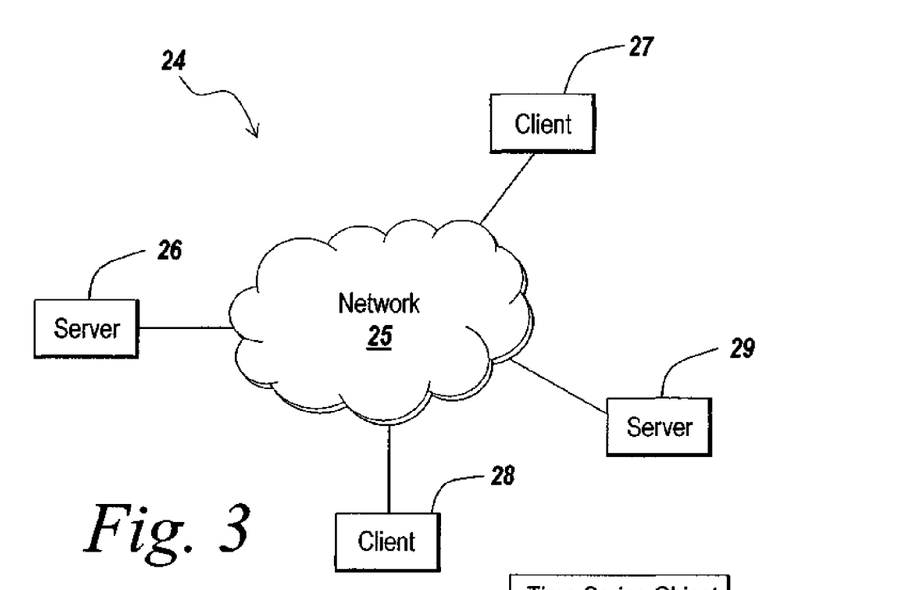
FIG. 3 is an exemplary network environment that enables an online implementation of the present invention.

FIG. 3 is an exemplary network environment 24 suitable for the distributed implementation of the illustrative embodiment. The network environment 24 may include one or more servers 26 and 27 coupled to clients 28 and 29 via a communication network 25. The network interface 16 and the modem 15 of the computing device 10 enable the servers 26 and 27 to communicate with the clients 28 and 29 through the communication network 25. The communication network 25 may include Internet, intranet, LAN (Local Area Network), WAN (Wide Area Network), MAN (Metropolitan Area Network), wireless network (e.g., using IEEE 802.11 and Bluetooth), etc. The communication facilities can support the distributed implementations of the present invention.

In the network environment 24, the client 28 may include the data source 4 and send time series data to the server 26 for analysis. The server 26 may include the analysis tool 8 and perform the analysis of the time series data received from the client 28. The server 26 then returns the analysis results to the client 28 and the client 28 may subsequently display the data to the user with the analyzed information on the data.

Figure 4:
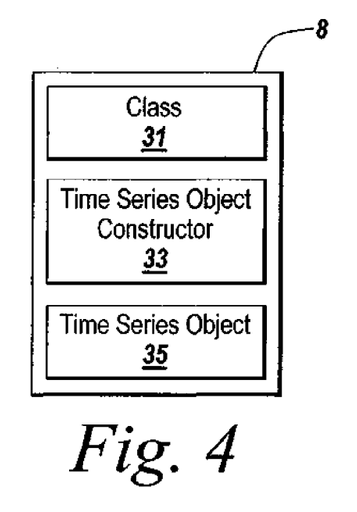
FIG. 4 shows an exemplary analysis tool depicted in FIG. 1.

FIG. 4 is an exemplary tool 8 provided in the illustrative embodiment of the present invention. The tool 8 may provide a class 31 and a constructor 33 for enabling a user to construct a time series object 35. The time series object 35 is an instantiation of the class 31. The class 31 defines the properties and methods of the time series object 35. The class 31 may contain data and time values, as well as metadata information including units, events, and status information and interpolation methods of the time series data. The user may use the constructor 33 to create an instance of the time series object 35. In the illustrative embodiment, the user may use the following constructor syntax to create the time series object 35.

Ts=timeseries; Creates an empty time series object

Ts=timeseries (data); Creates a time series object from the variable 'data' with a default time vector where 'data' is either a numeric array or a sequence of objects implementing APIs to access the data.

Ts=timeseries (data,time); Creates a time series object with the specified time vector where 'time' is a numeric array or a cell array of date strings representing the time vector.

Ts=timeseries (data, time, prop1, val1, prop2, val2, . . . ); Creates a time series object with properties assigned as specified where 'prop1', 'prop2', etc are strings describing properties of the time series objects and 'val1', 'val2', etc are the corresponding values of those properties.

Those of ordinary skill in the art will appreciate that the constructor syntax described above is illustrative and other syntaxes may be used in other embodiments of the present invention.

Figure 5:
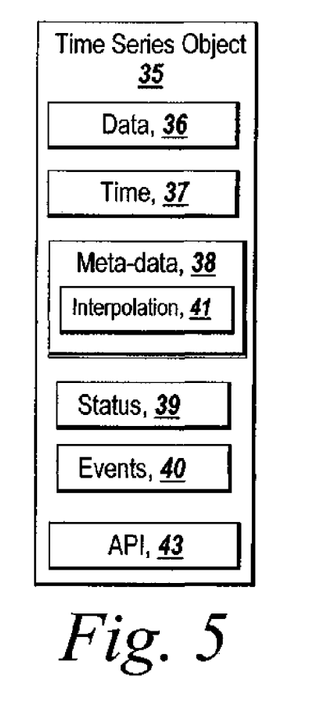
FIG. 5 shows an example of the time series object depicted in FIG. 4.

FIG. 5 shows an example of the time series object 35 constructed using the constructor 33 in the illustrative embodiment. The time series object 35 may contain properties of the object 35, including data 36, time 37, data status 39, metadata 38, and events 40 of the object 35. The data 36 can be a scalar, a vector or a multidimensional array. The time field 37 contains information for indexing the data 36. Its contents can be specified directly as a numeric array or cell array of dates or indirectly using metadata by defining start time, end time and interval between two subsequent time values. Other descriptive information about data and time, data, interpolation method information 41, etc is also stored as metadata 38. Those of ordinary skill in the art will appreciate that although the status 39 and events 40 are depicted separately from the metadata 38 in the illustrative embodiment, the status 39 and events 40 can be included in the metadata 38 in a different embodiment. The time series object 35 contains this information in a single structure.

In particular, the user may encapsulate the status information 39 of the time series data in the time series object 35. These cases often arise if the data in the time series object 35 is derived from experimental data, databases, communication links etc., where there may a need to distinguish parts of the data using criteria which are not expressed in the numerical values of the data itself. For example, in a data set expressing the results of a sequence of experiments, there may be a need to identify the data associated with some of the experiments as being invalid or suspect without explicitly removing those records from the data set. In another example, if data is recorded from a communication channel, there may be a need to identify parts of the data as being compromised by transmission conditions.

The time series object 35 enables numeric data to be optionally 'tagged' with an array of integer status values. The status value array may be as large as the numeric data array in the time series object. The integer status values may be drawn from an enumerated list of integers which are paired with text descriptions of their meanings in a look-up table stored within the time series object in another metadata object. An advantage of tagging the status of each data point is that it enables the data to be processed conditionally by the dataset object methods, depending on the status of that data.

Figure 6:
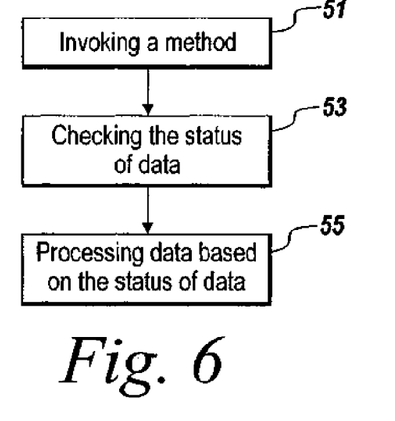
FIG. 6 is a flow chart showing an exemplary operation for the conditional processing of time series data.

FIG. 6 is a flowchart showing an exemplary operation for the conditional processing of time series data. The conditional processing can be performed by making methods take actions depending on the status values of the data stored in the object. For example, when the 'mean' method is called on a time series object (step 51), a list of status values identifying data as missing or invalid can be passed to the method. The method can then check the status values (step 53) and exclude any data with the missing or invalid status values (step 55). By employing status values in this manner, the user can exclude subsets of the data (within data set objects) when calling statistical methods, such as mean, median, standard deviation, etc.

Referring back to FIG. 5, the time series object 35 may also include objects implementing APIs 43 for providing an interface that enables a user to manipulate and analyze the time series data in the time series object 35. The APIs 43 may include functions or methods for manipulating, analyzing, plotting, correlating, interpolating and filtering the data 36 and time 37 in the object 35. The APIs 43 may provide overloaded methods, such as descriptive statistical methods (mean, median, std, iqr, etc.) which compute statistics on time series data with options to weight data by time interval, signal processing methods (fft, filter, idealfilter, detrend) which process the time series data making explicit use of the encapsulated time vector, and overloaded base MATLAB methods (loadobj, size, end, transpose, isempty, length, plot) which are customized for time series objects.

The APIs 43 may include functions or methods that enable the user to combine and re-sample time series data in the time series object. Using the APIs 43, the time series data in the time series object can be re-sampled at different times. Processing of time series data may involve re-sampling operations frequently. For example, a non-uniformly time series may be re-sampled at a uniform rate in order to take a Fourier transform or perform a filtering operation. Two time series that are sampled at different times may be re-sampled onto the same time vector before they can be added together. When re-sampling operations involve adding new samples to the time series for time instants that were not in the original data set, the data corresponding to those new time instants may be estimated from the existing data by interpolating or extrapolating the data. The re-sampling may also apply to the analysis of multi-rate data logged from a simulation system.

Figure 7:
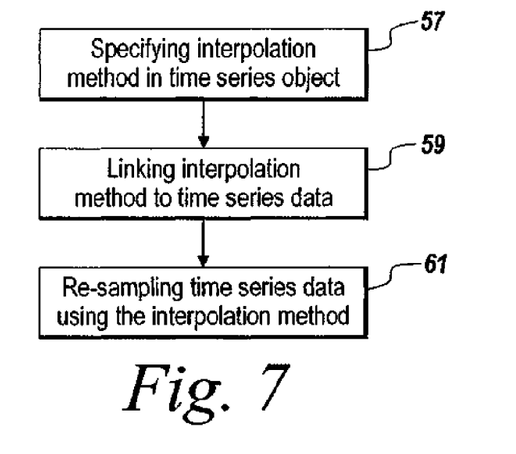
FIG. 7 is a flow chart showing an exemplary operation for re-sampling time series data.

FIG. 7 is a flow chart showing an exemplary operation for re-sampling the time series data. The illustrative embodiment enables a user to specify the interpolation method 41 within the times series object 35 (step 57) and links the method to the times series data in the object (step 59). The appropriate method for performing the interpolation or extrapolation can be determined by the conditions under which the data is collected. For example, if a time series represents the results of simulation or a real time system, a zero order hold type interpolation can be used to estimate data between samples to avoid the need for non-causal estimation. Alternatively, in cases where re-sampling can cause aliasing, the interpolation method can employ an anti-aliasing filter as part of the interpolation method.

Since the object 35 includes information on the interpolation method 41, the illustrative embodiment enables an automatic interpolation/extrapolation operation of time series data when re-sampling time series data (step 61). In the illustrative embodiment, the time series object stores a function handle defining the interpolation algorithm to be used when that time series is re-sampled by its methods or other calculations. An anonymous function handle or other representation of a mathematical formula can be used to represent the interpolation method to be used. The benefit of linking time series objects and their interpolation algorithms is that the syntax of combining time series objects using methods, such as overloaded arithmetic or re-sampling, is simplified by avoiding the need to specify the interpolation method to be used whenever calculations require resampling, extrapolation or interpolation.

Figure 8:
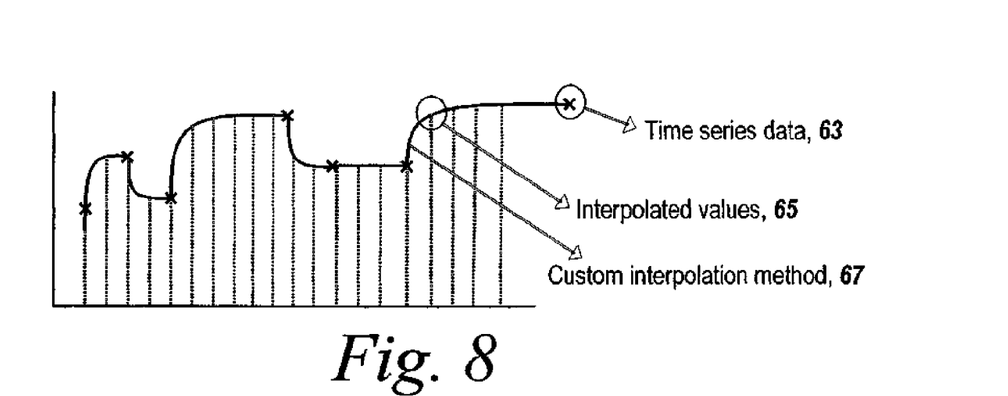
FIG. 8 depicts an exemplary interpolation of time series data in the illustrative embodiment.

FIG. 8 depicts an exemplary time series data 63 interpolated using the custom interpolation method 67 specified in the time series object 35. The non-uniform time series data 63 is re-sampled at a uniform rate with the addition of the interpolated values 65. Where two or more time series objects with different interpolation methods are combined to produce additional time series objects (such as for overloaded arithmetic operations), precedence rules may be used to determine which interpolation method carries through to the resulting objects. This requires that a hierarchy of interpolation methods be established so that the precedence rule can select the output object interpolation method as the hierarchically extreme value among a list of input interpolation methods.

Referring back to FIG. 5, the time series object may also include APIs for sub-selecting time series data. In many data analysis tasks the first step often selecting a period of interest for further analysis. The illustrative embodiment may provide methods to extract data from the time series object 35 using time intervals bounded by events 40. The methods may optionally interpolate time series data at the end points using the interpolation method specified in the time series object 35.

Figure 9:
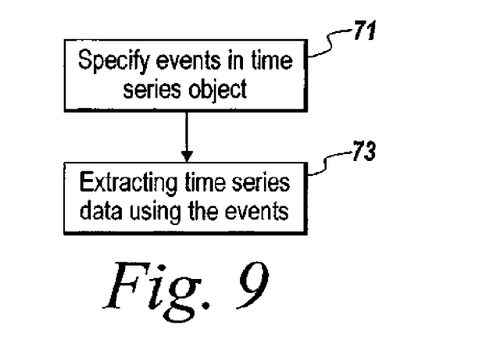
FIG. 9 is a flow chart showing an exemplary operation for extracting a portion of time series data.

FIG. 9 is a flow chart showing an exemplary operation for selecting a period of interest in the time series object. The user may implement event objects in the time series object 35 to represent time instants of interest with string valued descriptions (step 71). For example, a flight test data set using time series objects may contain event objects representing the times of take-off and landing events. The primary purpose of these events is to aid the user in extracting data from periods of interest. In the flight test example, the data between take-off and landing events can be extracted by calling a method of the time series object(s) representing the flight data and passing the names of the take-off and landing events (step 73). The time series object 35 may provide a number of methods which accept one or more event names specifying the start and end times of intervals of interest and returning a time series object representing the time series data contained within those intervals. Other purposes of event objects are to align time series whose time vectors are offset due to differing zero reference times and to annotate periods of interest within plots of time series data. Additionally some types of event object may depend upon the time series data, so that if the data is changes, the location of that type of event may change. This enables events to represent the timing of key features of the data, such as the first time that the altitude in flight test data exceeds 10000 ft.

Referring back to FIG. 5, the time series object may also include APIs for sub-referencing time series data for extracting an interval of the time series data. The illustrative embodiment may provide a sub-referencing syntax for extracting time series data from a period of interest. For example the code:
>> ts2=ts1(1:10);
may create a time series object ts2 from the first 10 samples of the time series object ts1. The use of the colon operator for sub-selection is illustrative and other operators can be used for the sub-selection operation. The inverse operation is concatenation. For example:
>> ts3=[ts1; ts2];
may create a new time series object ts3 by concatenating the samples of ts3 after ts2. The use of the semi-colon operator for the concatenation of time series objects is illustrative and other operators can be used for the concatenation operation.

Figure 10:
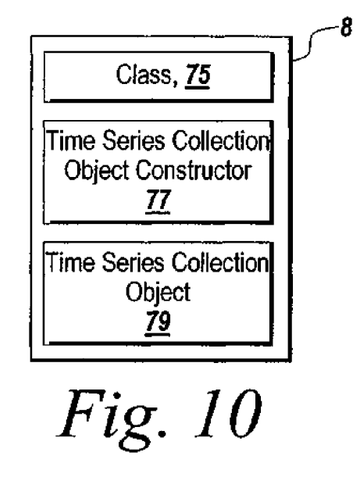
FIG. 10 is another embodiment of the analysis tool depicted in FIG. 1.

FIG. 10 depicts that the exemplary tool 8 may provide a class 75 and a constructor 77 for enabling a user to construct a time series collection object 79 using a command line interface. The time series collection object 79 is an instantiation of the class 75. The class 77 defines the properties and methods of the time series collection object 79. The class 75 may contain a group of time series objects that share a common time vector to enable operations on related groups of synchronized time series data. The user may use the constructor 75 to create an instance of the time series collection object 79. In the illustrative embodiment, the user may use the following constructor syntax to create the time series collection object 79.

Ts=tscollection(time); Creates a time series collection object with no member time series objects and a common time vector defined by the MATLAB numeric array or cell array or data stings 'time'

Ts=tscollection(ts1); Creates a time series collection object based on the time series object 'ts1', i.e., the common time vector is defined by the time vector of 'ts1' and a copy of 'ts1' is the sole member time series of the time series collection.

Ts=tscollection (tscell); Creates a time series collection object based on the cell array of time series objects 'tscell' which have a common time vector, i.e., the tscollection object time vector is the common time vector and the member time series objects are copies of the contents of the cell array 'tscell'.

Those of ordinary skill in the art will appreciate that the constructor syntax described above is illustrative and other syntaxes may be used in other embodiments of the present invention.

Figure 11:
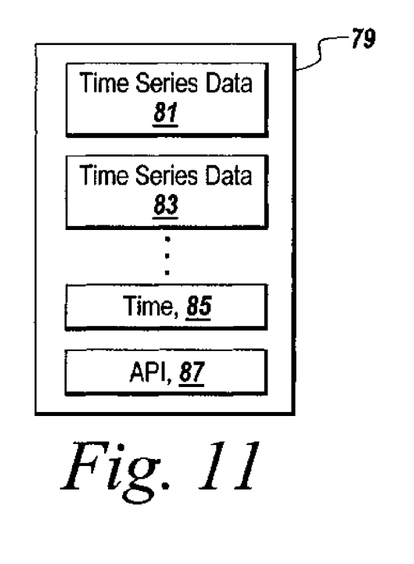
FIG. 11 shows an example of the time series collection object depicted in FIG. 10.

FIG. 11 shows an example of the time series collection object 79 constructed using the constructor 77 in the illustrative embodiment. The time series collection object 79 may have properties containing member time series objects 35, including time series objects 81 and 83. The time series collection object 79 encapsulates one or more time series objects 81 and 83 with different properties but the same time vector 85 into a single object. Each constituent time series object is a member of the time series collection object. Each member time series object is presented as the contents of a property of the time series collection object whose name is derived from the name of the member time series object.

A common reason for assembling time series objects into a time series collection object is to enable time interval(s) to be selected by inspection or analysis of one time series object in the time series collection object, but to have that selection apply to all time series objects in the time series collection object simultaneously. For example, a flight test data set may consist of multiple time series collected from various channels all with a common time vector. The flight data analyst may be interested in only in data (from all time series) collected during the time period when the altitude member time series was between 10,000 ft and 10,500 ft.

Another benefit of using the time series collection object to store multiple member time series data with the same time vector is the memory economy associated with storing the time vector only once, rather than separately for each time series. This centralized time vector storage is implemented in a manner which enables the user/developer to access and manipulate the time vector from any of the 'Time' properties of the time series collection object member time series objects without being aware of its storage within the time series collection.

The APIs 87 may provide methods for adding, removing, accessing and listing member time series objects. Examples of the APIs 87 may include delsamplefromcollection, getsampleusingtime and overloaded sub-referencing and sub-assignment methods provided in MATLAB®. The APIs 87 may provide a command line interface that enables time intervals to be used to extract data from all member time series in the time series collection object. The following syntax may be used at the command line (the command line is a string of text written in the command language and is passed to the tool 8 for execution) to identify a time interval and have the selection apply to all time series in the data set.
>> coll2=coll1(200:245);
The method may find the interval of interest consisting of samples 200-245 and create a new time series collection object coll2 representing all the time series members on the selected time vector coll1.Time(200:245). If the time series collection object coll1 contains time series objects ts1, ts2, etc., then the object coll2 will have the same member time series but restricted to this time interval. The ts1 time series object can be inspected by accessing it using the syntax coll1.ts1, coll2.ts1

Figure 12:
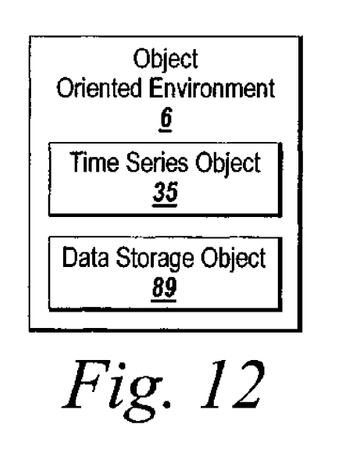
FIG. 12 is another exemplary object oriented environment that provides a data storage object for storing the data and/or time of the time series object.

In the illustrative embodiment, the data and time arrays of a time series object can be stored in a data storage object that represents a data source 4. FIG. 12 shows an exemplary object oriented environment that may provide a data storage object 89 for abstracting the data source 4. The data storage object 89 may represent the connection of the time series object data stored in internal or external files (MAT files, spreadsheets, text files), databases, or devices. The files can be MATLAB® memory mapped files. Abstraction of the data source can provide the option of storing the data of a time series object in an external data source, such as a database or file. The external data source enables a user to work more effectively with large data sets or with large numbers of time series, and can eliminate the need for the user to take explicit manual action to read or write from an external data source. Another advantage of the abstracted data source is the ability to store the data internally to the object-oriented environment in compressed form. The data storage object can be written so that internal data is stored using lossless compression or mathematical expressions in the form of MATLAB® function handles.

Figure 13:
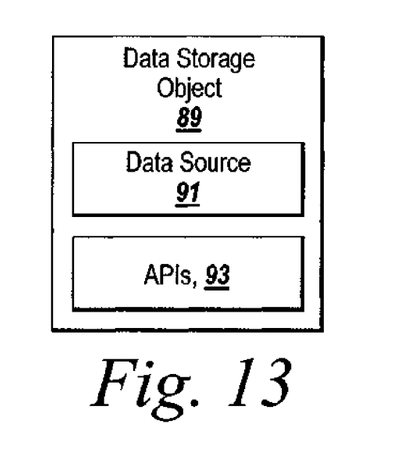
FIG. 13 is an example of the data storage object depicted in FIG. 12.

FIG. 13 is an example of the data storage object depicted in FIG. 12. The data storage object 89 may include the properties 91 of the data source 4. The data storage object 89 may implement standardized APIs 93 (i.e. APIs which do not depend on the data source type) that supply an interface for accessing data in the data source 4. The data storage object 89 translates those standardized API calls into source-specific API calls which access the data source so that the data in the data source can be accessed through the standardized methods of the APIs 93. When a user read or writes data to the data or time of the time series object, the data can be read from or written to the data source via the APIs 93 of the data storage object 89.

The time series data may represent multitude of data, such as time varying ensemble data generated by stochastic simulators, video signals, sound signals, parameter scan data and sensitivity analysis data and mathematical functions of time, in other embodiments. Since the time sampling of each simulation run can be completely different in stochastic simulations, the tool 8 may re-sample the time series simulation data to a common time vector, usually one with the shortest end time. Once re-sampled, the tool analyzes time series simulation data at every time step of the common time vector to get the mean and standard deviation. This information is used to generate the probability distribution curve as a function of time. Based on how the mean, standard deviation and probability density varies with time, a 3D surface is draped over it by creating a triangulated mesh. The surface is rendered using the color map and the lighting scheme selected by the user. Such a plot provides important information visually like how the mean varies as a function of time, how the spread varies with time, for a given species amount within the spread what the corresponding probability density is. Users can look at the plot and quickly glean critical information like what the mean and standard deviations are at any time, how they vary as a function of time, how the probability density function is distributed at a given time and how it varies with time.

The tool 8 can also be used to show the results of parameter scan and sensitivity analysis in a single plot. In parameter scan, a parameter is varied from lower to upper limit within its range, to generate similar time varying data. In sensitivity analysis, sensitivity of a state with multiple parameters is computed at any given time, but the parameters themselves can be varying with time. The tool 8 may depict information on how sensitive the model is to a parameter value, how the sensitivity varies as a function of time and how varying parameters affects simulation results.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computing device implemented method comprising:
receiving, using a computing device, time series data at an object-oriented environment, the time series data including a sequence of data representing data measured at successive time intervals;
generating, using the computing device, a time series object, the time series object encapsulating:
the time series data,
a time array,
a data status identifier associated with at least a first section of the time series data, the data status identifier distinguishing the first section of the time series data from a second section of the time series data,
metadata associated with the sequence of data,
a plurality of events, and
objects for implementing an application programming interface (API);
extracting the time series data from the time series object at given time intervals defined by the plurality of events, the given time intervals being among the successive time intervals; and
analyzing the time series data within the time series object using the API.

2. The method of claim 1, further comprising:
storing the time series data in a data source external to the object-oriented environment; and
using a data storage object to represent a connection to the data source.

3. The method of claim 1, further comprising:
storing the time series data internally to the object-oriented environment using a data storage object, wherein the time series data is stored in a compressed form.

4. The method of claim 1, wherein portions of the time array are matched with corresponding portions of the time series data.

5. The method of claim 1, wherein the time series object is generated using a command received via a command line interface.

6. The method of claim 1, wherein the time series data is a scalar, a vector or a multidimensional array.

7. The method of claim 1, wherein the time series object encapsulates information for indexing the time series data.

8. The method of claim 1, further comprising:
sub-referencing the time series data; and
extracting an interval of the time series data based on the sub-referencing.

9. The method of claim 1, wherein the time array encapsulates a time index of each element of the sequence of data.

10. A computing device implemented method comprising:
providing, using a computing device, a first time series object and a second time series object, where:
the first time series object:
has a first time vector,
has a first set of properties, and
encapsulates time series data including a first sequence of data measured at given successive time intervals,
the second time series object:
has a second time vector equivalent to the first time vector,
has a second set of properties, and
encapsulates time series data including a second sequence of data, the second sequence of data:
measured at the given successive time intervals,
being different from the first sequence of data,
generating, using the computing device, a time series collection object, the generating comprising:
storing the first time series object in the time series collection object, and
storing the second time series object in the time series collection object;
extracting the time series data from the time series collection object at time intervals defined by a plurality of events, the time intervals defined by the plurality of events being among the given successive time intervals; and
analyzing, using the computing device, the time series data within the time series collection object.

11. The method of claim 10, wherein the first time series object and the second time series object are each represented as a respective property of the time series collection object, each such property having a name, the name being derived from a name of the first time series object or the second time series object, respectively.

12. The method of claim 10, further comprising:
selecting a time interval for analysis; and
extracting data, using a command line interface, from the first time series object and the second time series object that correspond to the selected time interval.

13. The method of claim 10, further comprising:
allocating a storage location to the first time vector and the second time vector.

14. The method of claim 10, further comprising:
adding a third time series object to the time series collection object.

15. The method of claim 10, further comprising:
removing the first time series object or the second time series object from the time series collection object.

16. The method of claim 10, further comprising:
displaying a list of time series objects contained in the time series collection object.

17. A non-transitory medium storing computer executable instructions that, when executed by a processor, cause the processor to:
receive time series data at an object-oriented environment, the time series data including a sequence of data representing data measured at successive time intervals;
generate a time series object, the time series object encapsulating:
the time series data,
a time array,
a data status identifier associated with at least a first section of the time series data, the data status identifier distinguishing the first section of the time series data from a second section of the time series data,
metadata associated with the sequence of data,
a plurality of events, and
objects for implementing an application programming interface (API);
extract the time series data from the time series object at given time intervals defined by the plurality of events, the given time intervals being among the successive time intervals; and
analyze the time series data within the time series object using the API of the time series object.

18. The medium of claim 17, further storing one or more instructions that, when executed by the processor, cause the processor to:
store the time series data in a data source external to the object-oriented environment; and
use a data storage object to represent a connection to the data source.

19. The medium of claim 17, further storing one or more instructions that, when executed by the processor, cause the processor to:
store the time series data internally to the object-oriented environment using a data storage object, wherein the time series data is stored in a compressed form.

20. The medium of claim 17, wherein portions of the time array are matched with corresponding portions of the time series data.

21. The medium of claim 17, wherein the time series object is generated using a command received via a command line interface.

22. The medium of claim 17, wherein the time series data is a scalar, a vector or a multidimensional array.

23. The medium of claim 17, wherein the time series object encapsulates information for indexing the time series data.

24. The medium of claim 17, further storing one or more instructions that, when executed by the processor, cause the processor to:
sub-reference the time series data; and
extract an interval of the time series data based on the sub-referencing.

25. The medium of claim 17, wherein the time array encapsulates a time index of each element of the sequence of data.

26. A non-transitory medium storing computer executable instructions that, when executed by a processor, cause the processor to:
provide a first time series object and a second time series object, where:
the first time series object:
has a first time vector,
has a first set of properties, and
encapsulates time series data including a first sequence of data measured at given successive time intervals,
the second time series object:
has a second time vector equivalent to the first time vector,
has a second set of properties, and
encapsulates time series data including a second sequence of data, the second sequence of data:
measured at the given successive time intervals,
being different from the first sequence of data,
generate a time series collection object, the generating comprising:
storing the first time series object in the time series collection object, and
storing the second time series object in the time series collection object;

extract the time series data from the time series collection object at time intervals defined by a plurality of events, the time intervals defined by the plurality of events being among the given successive time intervals; and analyze the time series data within the time series collection object.

27. The medium of claim 26, wherein the first time series object and the second time series object are each represented as a respective property of the time series collection object, each such property having a name, the name being derived from a name of the first time series object or the second time series object, respectively.

28. The medium of claim 26, further storing one or more instructions that, when executed by the processor, cause the processor to:

select a time interval for analysis; and extract data, using a command line interface, from the first time series object and the second time series object that correspond to the selected time interval.

29. The medium of claim 26, further storing one or more instructions that, when executed by the processor, cause the processor to:

allocate a storage location to the first time vector and the second time vector.

30. The medium of claim 26, further storing one or more instructions that, when executed by the processor, cause the processor to:

add a third time series object to the time series collection object.

31. The medium of claim 26, further storing one or more instructions that, when executed by the processor, cause the processor to:

remove the first time series object or the second time series object from the time series collection object.

32. The medium of claim 26, further storing one or more instructions that, when executed by the processor, cause the processor to:

display a list of time series objects contained in the time series collection object.

33. A system comprising:

a storage device for storing a data source, the data source storing time series data including a sequence of data measured at successive time intervals; and a processor for executing instructions for:

providing an object-oriented environment, the data source being external to the object-oriented environment;

creating a time series object constructor for generating a time series object, the time series object encapsulating:

the time series data, a time array, a data status identifier associated with at least a first section of the time series data, the data status identifier distinguishing the first section of the time series data from a second section of the time series data, metadata associated with the sequence of data, a plurality of events, and an application programming interface (API);

providing an extraction tool for extracting the time series data from the time series object at time intervals defined by the plurality of events, the time intervals defined by the plurality of events being among the given successive time intervals; and providing an analysis tool for analyzing the time series data within the time series object using the API of the time series object.

34. A system comprising:

a storage device for storing a data source, the data source storing time series data including a sequence of data measured at successive time intervals; and a processor for executing instructions to provide:

an object-oriented environment, the data source being external to the object-oriented environment;

a time series collection object constructor for generating a time series collection object that stores a first time series object and a second time series object, where:

the first time series object:

has a first time vector, has a first set of properties, and encapsulates time series data including a first sequence of data measured at given successive time intervals, the second time series object:

has a second time vector equivalent to the first time vector, has a second set of properties, and encapsulates time series data including a second sequence of data, the second sequence of data: measured at the given successive time intervals; being different from the first sequence of data;

an extraction tool for extracting the time series data from the time series collection object at time intervals defined by a plurality of events, the time intervals defined by the plurality of events being among the given successive time intervals; and an analysis tool for analyzing the time series data within the time series collection object.

\* \* \* \* \*

UNITED STATES PATENT AND TRADEMARK OFFICE
CERTIFICATE OF CORRECTION

| | | |
|---|---|---|
| PATENT NO. | : 8,631,392 B1 | Page 1 of 1 |
| APPLICATION NO. | : 13/243336 | |
| DATED | : January 14, 2014 | |
| INVENTOR(S) | : James G. Owen et al. | |

It is certified that error appears in the above-identified patent and that said Letters Patent is hereby corrected as shown below:

Title page, item (57) ABSTRACT, line 10, after "analyzing the" delete "times" and insert --time-- in lieu thereof     In the Specification     Column 1, line 4, after "is" insert --a--

Column 1, line 38, delete "it's" and insert --its-- in lieu thereof Signed and Sealed this
Thirtieth Day of September, 2014

Michelle K. Lee
*Deputy Director of the United States Patent and Trademark Office*